W. J. KNOX.
BRAKE RATCHET MECHANISM.
APPLICATION FILED SEPT. 20, 1916.

1,209,455.

Patented Dec. 19, 1916.
3 SHEETS—SHEET 1.

WITNESS

INVENTOR
W. J. Knox
ATTORNEYS

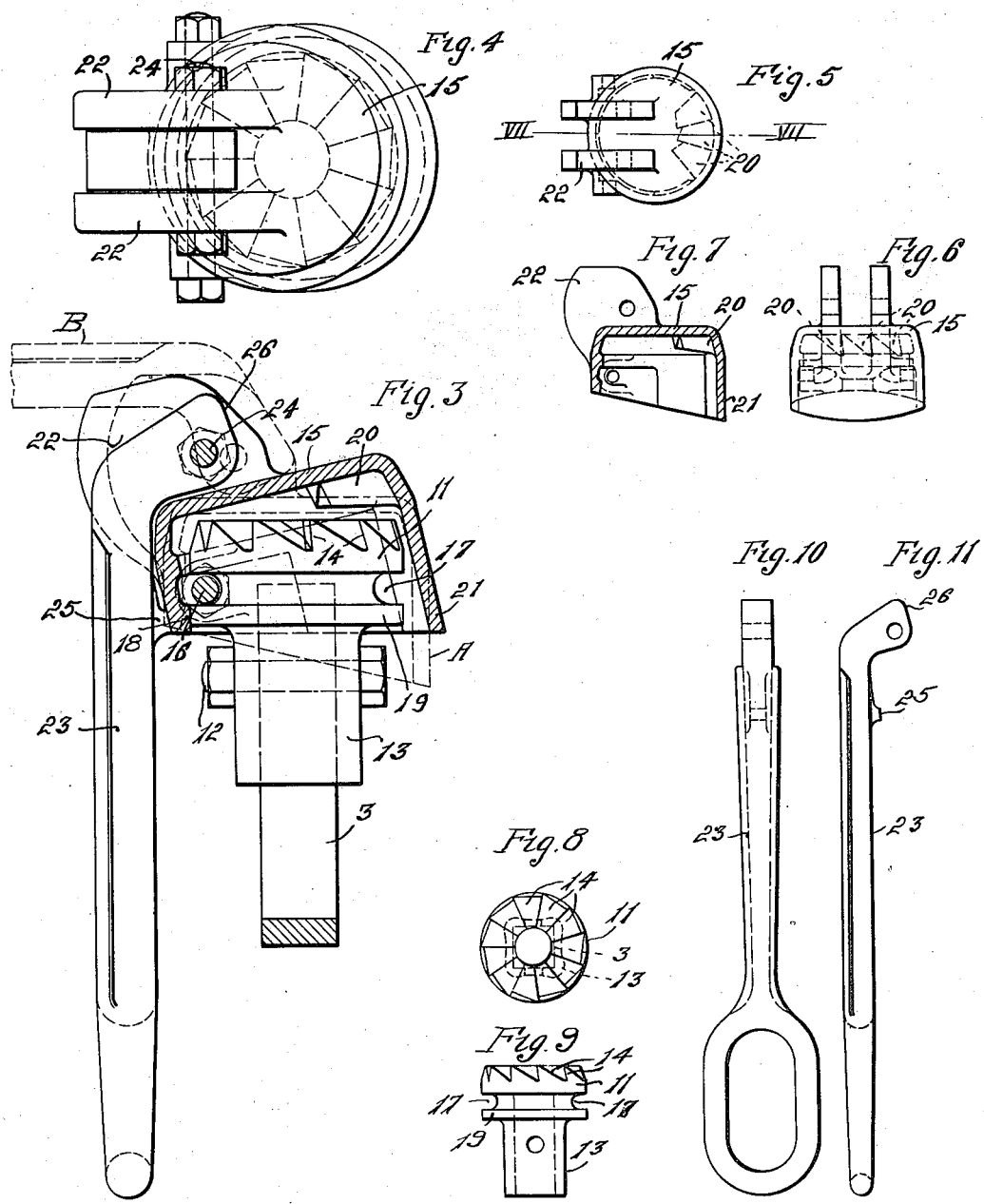

W. J. KNOX.
BRAKE RATCHET MECHANISM.
APPLICATION FILED SEPT. 20, 1916.
1,209,455.
Patented Dec. 19, 1916.
3 SHEETS—SHEET 3.
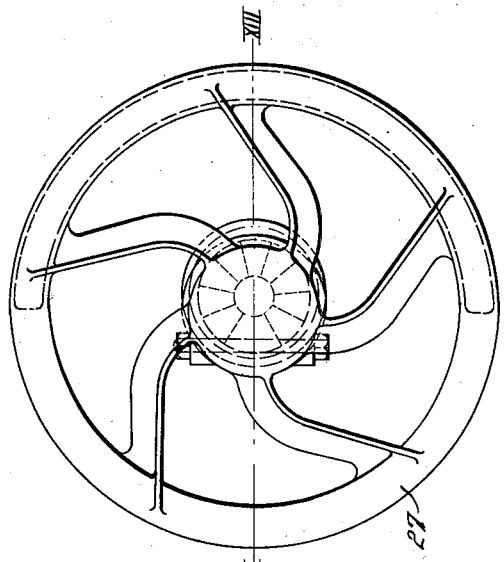
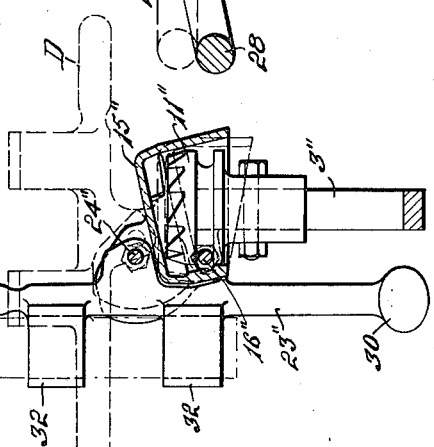
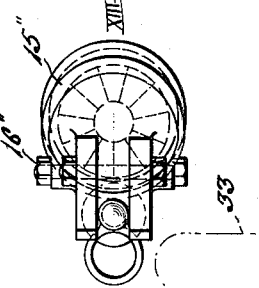
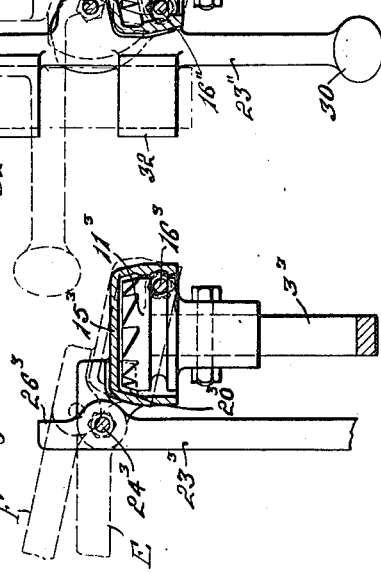
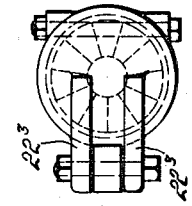
WITNESS
INVENTOR
ATTORNEYS

UNITED STATES PATENT OFFICE.

WILLIAM J. KNOX, OF DUBOIS, PENNSYLVANIA.

BRAKE RATCHET MECHANISM.

1,209,455.

Specification of Letters Patent.    Patented Dec. 19, 1916.

Application filed September 20, 1916. Serial No. 121,160.

*To all whom it may concern:*

Be it known that I, WILLIAM J. KNOX, a citizen of the United States, residing at Dubois, in the county of Clearfield and State of Pennsylvania, have invented certain new and useful Improvements in Brake Ratchet Mechanisms, of which the following is a specification.

This invention relates to brake ratchet mechanism of the drop handle type in which the raising of the handle moves the operating elements into operative relation and the lowering of the handle moves the elements out of operative relation, and has for its principal objects, the provision of a brake ratchet mechanism that is simple and positive in its action, a brake ratchet mechanism that consists of a minimum of operating elements; the provision of a mechanism wherein the operating pawl serves as a cover and protection for the ratchet wheel, and such other objects as may hereinafter appear. Several embodiments of the invention are shown in the accompanying drawings, wherein—

Figure 2:
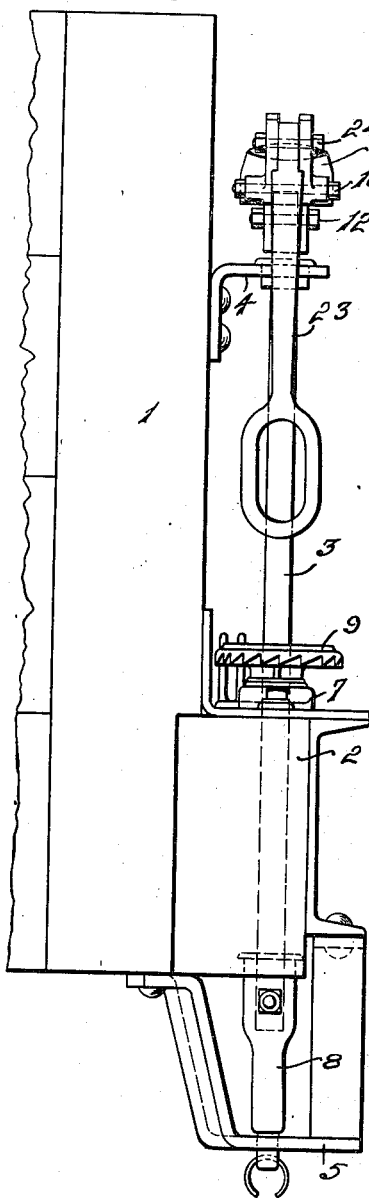
Figure 1:
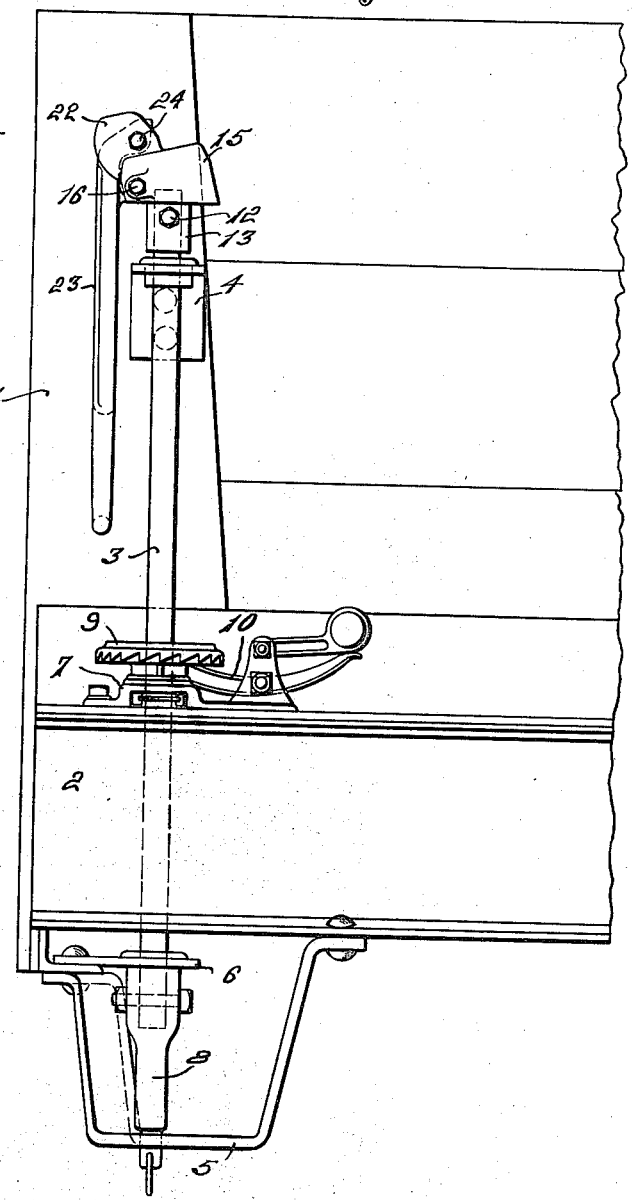

Figure 1 is a front view showing the complete brake rod and operating elements applied to the end of a car; Fig. 2 is a side elevation of the apparatus shown in Fig. 1; Fig. 3 is an enlarged side elevation of the upper end of the brake shaft showing the cover pawl in vertical section; Fig. 4 is a plan view of the apparatus shown in Fig. 3; Figs. 5 and 6 are plan and end views respectively, of the cover pawl; Fig. 7 is a vertical section on the line VII—VII of Fig. 5; Figs. 8 and 9 are plan view and side elevation respectively, of the ratchet wheel; Figs. 10 and 11 are plan view and side elevation respectively, of the operating handle; Fig. 12 is a plan view of the upper end of the brake shaft showing a modified form of operating handle; Fig. 13 is a vertical section on the line XIII—XIII of Fig. 12; Fig. 14 is a plan view of the upper end of the brake shaft showing another modification of the operating handle; Fig. 15 is a side elevation of the mechanism shown in Fig. 14, showing the cover pawl in vertical section; Fig. 16 is a plan view of a modified form of cover pawl and operating handle; and Fig. 17 is a side elevation with the cover pawl shown in vertical section.

Referring more particularly to Figs. 1 to 4 of the drawings; 1 is a car, 2 is the end sill or bumper thereof; 3 is the brake shaft vertically mounted at the end of the car and journaled in the bumper 2 by means of clips 4, 5, 6, and the bearing casting 7; 8 is the windlass upon which the brake chain (not shown) is wound when the brake shaft 3 is rotated, and also serves to prevent longitudinal movement of the shaft 3; 9 is a ratchet wheel serving to prevent the release of the brakes when they have been applied by the winding of the brake chain upon the windlass 8; and 10 is a gravity operated pawl for preventing rotation of the ratchet wheel in the direction tending to release the brakes. This part of the apparatus may be of the usual type and no claim is made to the arrangement of parts just described.

The invention relates to the ratchet mechanism adjacent the top of the brake shaft, which is of the drop handle type to permit of the operation of the brake shaft in close quarters such as in the application illustrated in Figs. 1 and 2, or on passenger coaches where there is no room for the usual brake wheel.

Referring more particularly to Figs. 3 and 4, the improved apparatus comprises a ratchet wheel 11, non-rotatably secured to the top of the brake shaft 3 by means of a bolt 12 passing through the hub 13 of the brake wheel and the shaft 3. The upper portion of the ratchet wheel 11 is of greater diameter than the hub and is provided on its upper face with a series of ratchet teeth 14.

A combined cover and pawl 15, hereinafter designated as a cover pawl, fits loosely over the ratchet wheel, and is pivoted thereto by means of a pivot pin 16 carried in one side of the cover pawl. This pivot pin engages the ratchet wheel 11 in an annular groove 17 in the periphery of the ratchet wheel and prevents vertical movement of the side of the cover pawl adjacent the pivot pin. The side of the cover pawl 15 opposite the pivot pin 16 is free to oscillate vertically a limited distance determined by contact with the top of the cover in its downward position and by the stop 18 engaging the shoulder 19 of the ratchet wheel 11.

The cover pawl 15 is provided with three integral pawl teeth 20 arranged on the under side of the cover pawl top directly opposite the pivot pin 16. Normally the cover pawl will rest upon the ratchet wheel 11 in the position A, indicated in dotted lines in Fig. 3. At such time the pawl teeth 20 will mesh with the ratchet teeth 14 and will cause the ratchet wheel 11 and brake shaft 3 to rotate when the cover pawl is turned anti-clockwise. If the cover pawl is turned clockwise the pawl teeth 20 will ratchet over the ratchet wheel teeth 14 and the only motion will be the vertical oscillation of the cover pawl and the rotation thereof. The brake shaft will not be rotated. It will be seen from the foregoing that the cover pawl is secured to the ratchet wheel so that it cannot be removed without first removing the pivot pin 16 and that the cover pawl 15 is free to oscillate vertically and rotate with respect to the ratchet wheel. Lateral displacement of the cover pawl is prevented by the downward projecting flange 21 which surrounds the ratchet wheel.

A pair of webs 22 are formed integral with the cover pawl between which the operating lever or handle 23 is pivoted at a point remote from the vertical axial center of the cover pawl, by means of a pivot bolt 24 which passes through the webs 22 and the upper end of the handle 23. The handle is provided with a stop 25 adapted to engage the lower edge of the cover pawl below the pivot pin 16. The handle pivot 24 is preferably located directly above the cover pawl pivot pin 16 and the handle bent so that it clears the side of the cover pawl. This construction places the preponderance of weight of the handle to one side of the pivot 16, thereby causing the cover pawl to be raised so that the teeth 20 are out of engagement with the teeth 14 of the ratchet wheel. While the handle 23 is in its lower position, indicated in full lines in Fig. 3, the brake shaft may rotate without causing the handle to rotate. When the handle is raised to operative position B, indicated by dotted line, the cover pawl will be forced down upon the ratchet wheel by the action of gravity. The nose 26 on the short end of the handle 23 serves to limit the upward movement of the handle 23 by its engagement with the top of the cover pawl and may be used to positively hold the cover pawl in engagement with the teeth 14.

To set the brakes, the operator raises the handle to position B and turns it anti-clockwise. This action causes the teeth 20 of the cover pawl to engage the teeth 14 of the ratchet wheel 11 and rotate it with the cover pawl. When the return stroke is made, the cover pawl ratchets over the teeth 14 without causing any movement of the ratchet wheel. Therefore, oscillation of the handle 20 about the ratchet wheel will cause its rotation in one direction.

Referring to Figs. 12 and 13, wherein a modified form of operating handle is shown, the shaft 3' and ratchet wheel 11' are substantially the same as in the previously described construction. The cover pawl 15' is the same as that previously described with the exception that the handle 27, which in this modification is in the form of a hand wheel, is preferably cast integral with the cover pawl.

The cover pawl 15' is pivoted to the ratchet wheel in the same manner as that employed in the previous construction by means of a pivot pin 16'. The portion of the operating handle 27 upon the side adjacent the pivot pin is made solid, as at 28, while the remaining portion of the handle is cast in the form of a thin shell, as at 29, thereby making the side of the handle adjacent the pivot pin heavier than the side remote therefrom. The heavy side of the handle 27 will be moved to its lowermost position by gravity thereby tilting the cover pawl 15' so that the pawl teeth 20' will remain out of engagement with the ratchet wheel teeth 14'. When it is desired to operate the brakes, the handle 27 is moved to position C, indicated by dotted lines in Fig. 13. At this time the pawl teeth 20' will engage the ratchet wheel teeth 14' so that the ratchet wheel and shaft will be rotated with the hand wheel when the hand wheel is rotated anti-clockwise. Upon the return stroke wherein the handle 27 is rotated clockwise, the operator permits the handle to tilt sufficiently to let the pawl teeth 20' ratchet over the ratchet wheel.

Referring to Figs. 14 and 15, another modified form of handle 23" is illustrated. In this application the brake shaft 3" and the ratchet wheel 11" and the cover pawl 15" are substantially the same as employed in the first construction. The handle 23" is provided at one end with a ball end 30 which serves as a counterweight to bring the handle into the lower position shown in Fig. 15, when not in operation. The handle is pivoted to the cover pawl by the bolt 24" in a manner similar to that employed in the first described apparatus, but is provided with an extension handle 31 extending beyond the pivot 24". When this handle is used it is moved up to position D, indicated in dotted lines in Fig. 15, and one hand of the operator grips the ball 30, while the other hand grips the handle 31. In order that an increased leverage may be obtained when desired, the handle is provided adjacent the short end thereof with a pair of rings or sockets 32 into which may be inserted a wooden handle 33 of any desirable length. This would be used in the event that sufficient pressure could not be applied to the brakes with the handle without the aid of the longer lever arm, such as a wooden handle. The operation of the ratchet in this case is precisely the same as that employed in the first described apparatus.

Referring to Figs. 16 and 17, the brake shaft 3³ and the ratchet wheel 11³ are substantially the same as in the previously described constructions, but the cover pawl 15³ is somewhat modified. It will be observed that in this case the webs 22³ which serve as a pivot support for the handle 23³ are placed on the side of the cover pawl opposite the pivot pin 16³. The pawl teeth 20³ are disposed on the side of the cover pawl opposite the pivot also, and the weight of the handle 23³ suspended from the pivot 24³ tends to normally hold the pawl teeth in engagement with the teeth of the ratchet wheel. When it is desired to operate the brake shaft 3³, the handle 23³ is raised to position E when it may be rotated to rotate the brake shaft 3³. Upon the reverse stroke the cover pawl will ratchet over the teeth of the ratchet wheel 11³ without causing its rotation. When it is desired to release the brakes without rotating the handle the handle 23³ is raised to the position F drawing the pawl out of engagement with the teeth of the ratchet wheel. The ratchet wheel may then rotate to release the brakes without causing movement of the handle.

It will be observed that there are numerous ways in which the apparatus may be designed without departing from the spirit of the invention, and the invention is therefore, not limited to the specific structures herein illustrated and described.

What I claim is:

1. In combination, a brake shaft, a ratchet wheel non-rotatably secured to the brake shaft, a pawl pivoted to the ratchet wheel for vertical oscillation, and having rotary movement therewith adapted to engage the teeth of the ratchet wheel, and a handle for rotating the brake shaft secured to the pawl whereby the pawl may be moved into or out of engagement with the teeth of the ratchet wheel.

2. In combination, a brake shaft, a ratchet wheel non-rotatably secured to the brake shaft, a pawl pivoted to the ratchet wheel and having vertical and rotary movement with respect thereto adapted to normally engage the teeth of the ratchet wheel, and a handle pivoted to the pawl and adapted in its lower position to disengage the pawl from the teeth of the ratchet wheel, and in its upper position to permit the engagement of the pawl with the teeth of the ratchet wheel.

3. In combination, a brake shaft, a ratchet wheel non-rotatably secured to the upper end of the brake shaft, a cap covering the ratchet wheel pivoted thereto for vertical oscillation and having rotary movement with respect thereto, a pawl secured to the cap adapted to engage the teeth of the ratchet wheel, and a handle for rotating the brake shaft secured to the cap for moving the pawl into or out of engagement with the teeth of the ratchet wheel.

4. In combination, a brake shaft, a ratchet wheel non-rotatably secured to the brake shaft, a pawl pivoted to the ratchet wheel and having vertical and rotary movement with respect thereto adapted to normally engage the teeth of the ratchet wheel, and a handle pivoted to the pawl normally held in its lower position by gravity and adapted in its lower position to disengage the pawl from the teeth of the ratchet wheel and in its upper position to permit the engagement of the pawl with the teeth of the ratchet wheel.

5. In combination, a brake shaft, a ratchet wheel non-rotatably secured to the brake shaft, a pawl pivoted to the ratchet wheel and having vertical and rotary movement with respect thereto adapted to normally engage the teeth of the ratchet wheel, and a handle operatively connected with the pawl having greater weight on one side of the pawl pivot than on the other for normally holding the pawl out of engagement with the teeth of the ratchet wheel and adapted to move the pawl into engagement with the teeth when the handle is moved to operative position.

6. In combination, a brake shaft, a ratchet wheel non-rotatably secured to the brake shaft provided with an annular groove in the periphery thereof, ratchet teeth in the upper face of the ratchet wheel, a pawl adapted to engage the teeth of the ratchet wheel provided with means for limiting the lateral movement of the pawl with respect to the ratchet wheel, a pivot pin secured to the pawl and in operative relation with the annular groove in the wheel whereby vertical movement of one end of the pawl is prevented by engagement of the pin with the wheel and rotary movement of the pawl with respect to the wheel permitted, and a handle for rotating the shaft in operative connection with the pawl.

7. In combination, a brake shaft, a ratchet wheel non-rotatably secured to the brake shaft provided with an enlarged head having teeth in the upper face thereof, a pawl adapted to engage the teeth of the ratchet wheel provided with means for limiting the lateral movement of the pawl with respect to the ratchet wheel, a pivot pin carried by the pawl and engaging the under side of the enlarged head of the ratchet wheel permitting rotary movement of the pawl with respect to the wheel and preventing upward vertical movement of one end of the pawl, and a shaft operating handle secured to the pawl whereby the free end of the pawl may be moved out of engagement with the teeth.

8. In combination, a brake shaft, a ratchet wheel non-rotatably secured to the top of the brake shaft, a protecting cover fitting loosely over the ratchet wheel and secured for rotary movement therewith by a pivot pin carried by the cover and engaging the wheel, whereby the cover is permitted to oscillate vertically about the pivot, teeth carried by the cover opposite the pivot adapted to engage the teeth of the ratchet wheel when the cover is in its lower position and a handle secured to the cover whereby the cover may be oscillated about the pivot and rotary movement may be imparted to the cover and brake shaft.

9. The combination with a brake handle pivoted adjacent one end to ratchet mechanism for operating a brake shaft, of a socket adjacent the pivoted end for securing an auxiliary handle for operating the brake shaft when the handle is moved to operative position.

WM. J. KNOX.